United States Patent [19]

Adell

[11] Patent Number: 4,803,810
[45] Date of Patent: Feb. 14, 1989

[54] END CAP FOR DOOR EDGE GUARD

[75] Inventor: Robert Adell, Sunnyvale, Tex.

[73] Assignee: U.S. Products Development Company, Sunnyvale, Tex.

[21] Appl. No.: 118,989

[22] Filed: Nov. 10, 1987

[51] Int. Cl.$^4$ ............................................. E05F 7/00
[52] U.S. Cl. ...................................... 49/462; 52/716
[58] Field of Search .................... 49/462, 461, 460; 220/352, 355; 52/716; 16/DIG. 2; 293/1, 123

[56] References Cited

U.S. PATENT DOCUMENTS

| 3,197,821 | 8/1965 | Bright | 52/716 |
| 3,290,082 | 12/1966 | Fritsch | 52/716 |
| 3,371,447 | 3/1968 | Ruff et al. | 52/716 |
| 3,392,498 | 7/1968 | Rogers | 49/462 |
| 4,520,594 | 6/1985 | Adell | 49/462 |
| 4,581,807 | 4/1986 | Adell | 49/462 |

FOREIGN PATENT DOCUMENTS 614749 2/1961 Canada ................................ 52/716

Primary Examiner—Kenneth J. Dorner
Assistant Examiner—Gerald A. Anderson
Attorney, Agent, or Firm—Rhodes and Boller

[57] ABSTRACT

An end cap for a door edge guard comprises an end wall disposed in covering relation to a lengthwise end of the edge guard onto which the end cap is inserted. Inner and outer walls extend from the end wall for fitting onto the lengthwise end of the edge guard. The outer wall has a generally U-shaped cross section corresponding to that of the edge guard for covering the base and both legs of the edge guard, preferably extending to cover the distal ends of the legs and into abutment with the sides of the edge onto which the edge guard is fitted. The interior wall of the end cap covers the interior of the base but does not extend the full length of the legs so as to leave the distal portions of the legs which apply self-retension forces to opposite sides of the door edge unencumbered by the presence of the end cap. The edge guard has color insulation on its exterior side and the end cap is molded with a color to match that of the outside insulation on the edge guard.

6 Claims, 1 Drawing Sheet

END CAP FOR DOOR EDGE GUARD

BACKGROUND AND SUMMARY OF THE INVENTION

This invention relates to ornamental and protective edge guards that are applied to the trailing edges of swinging closures such as an automobile's doors.

The applicant is the inventor of numerous inventions relating to various embodiments of door edge guards. Certain of these embodiments comprise insulated metal edge guards in which non-metallic insulating material, such as vinyl, is selectively applied to a predetermined width of metal strip according to a desired pattern, the insulated metal strip is processed, preferably by roll forming, to create a desired cross sectional shape for the edge guard, and thereafter the strip is cut into appropriate lengths to form the individual door edge guards. These cut edge guards may be further processed in order to impart appropriate curvature, as required, in order to conform them to the curvatures of particular door edges.

The use of metal as a primary constituent for a door edge guard is desirable because of the strength and retention characteristics which it possesses. For example, a suitable cross sectional design coupled with a suitable resiliency of the metal enables the edge guard to be self-retaining on the door edge such that use of additional fasteners or attachment procedures can be avoided. This is desirable because it expedites the installation process thereby saving the customer money.

The use of non-metallic insulating material on a metal edge guard, as evidence by a number of the applicant's prior patents, is desirable for both functional and esthetic purposes. From the functional standpoint, a layer of non-metallic insulating material, such as vinyl, for example, on the interior of the edge guard serves to insulate the metal of the edge guard from the painted metal of the door edge onto which the edge guard is installed. Non-metallic insulating material on the exterior of the edge guard is used to present desired decorative effects, such as color coordination. According to procedures such as that described above for the manufacture of door edge guards, an edge guard whose interior and exterior are completely insulated by vinyl will nonetheless present exposed metal, corresponding to the transverse cross sectional shape of the edge guard, at the ends of the edge guard where it is cut from the roll formed strip of material. Applicant's prior patents have contemplated that dipping, spraying or other treatment procedures can be used if desired to cover what would otherwise be the exposed metal at the ends of the elongate edge guard.

The present invention relates to a novel means for trating the ends of an insulated metallic edge guard and specifically, it relates to a new and unique end cap that is organized and arranged in a particular manner in relation to the edge guard and to the door edge onto which the edge guard is inserted. Particularly, the inclusion of an end cap at either one or both ends of an edge guard serves to cover the exposed metal which would otherwise exist at that location on the edge guard, yet such end caps do not impair the self-retention characteristics of the edge guard at the edge guard's elongate ends. The disclosed preferred embodiment of end cap is preferably fabricated from a suitable non-metallic material such as an elastomer or a plastic. End caps can be conveniently fitted onto the ends of an edge guard, and the edge guard then expeditiously assembled onto the door edge.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
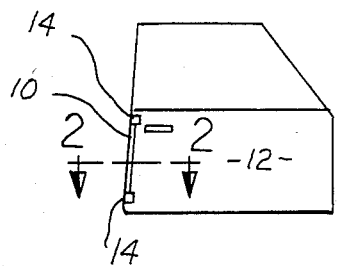
FIG. 1 is a fragmentary side elevational view of an automobile door, including the trailing edge, illustrating a door edge guard including end caps of the present invention fitted onto the door trailing edge.

FIG. 1 shows a door edge guard 10 on the trailing edge of an automobile door 12. Assmbled onto the ends of edge guard 12 are end caps 14 in accordance with principles of the present invention.

Edge guard 10 is formed from an elongate metal strip 15 into a transverse cross sectional shape that is geneally U-shaped. A representative transverse cross sectional shape appears in FIG. 2 and comprises a generally semi-circular base 16 and inner and outer legs 18 and 20, respectively, which extend from base 16. The distal ends of the legs are provided with beads 22 formed by the reverse turning of the marginal edge portions of the legs inwardly back against themselves. The transverse cross section is dimensioned such that in the free condition of the edge guard, the throat opening between the beaded distal ends of the legs is slightly less than the thickness of the door edge 24 so that when the edge guard is applied to the door edge, it slightly resiliently expands so that the beaded distal ends of the legs exert self-retention forces on opposite sides of the door edge. In this way, a self-retaining character is imparted to the edge guard which eliminates the use of separate fasteners or other attachment procedures.

In the disclosed embodiment of edge guard 10, insulating material is applied to the metal 15 of the edge guard for the purpose of providing both decorative and protection functions. The full exterior of the metal strip is covered by an insulating layer 26 while the interior is covered by an insulating layer 28. In forming of the beads 22, the exterior layer 26 wraps around the distalmost ends of the legs so that it is the layer 26 that is disposed at the points 30 and 32 at which self-retention forces are applied by the edge guard to the door edge.

Edge guard 10 is fabricated in any of several known ways including procedures that are the subject of certain other patents of the applicants. A preferred way of fabricating the edge guard is by passing a metal strip from which the metallic portion 15 of the edge guard is formed, in the flat through an extruder which applies insulating material in the desired coverage pattern to the metal strip as the metal strip passes through the extruder. After the plastic insulating material has solidified to form the insulating layer, the insulated metal is roll formed to the illustrated cross sectional shape. Thereafter, an appropriate length is cut from the roll formed strip to form edge guard 10 but this leaves the metal of the edge guard exposed at the points of severing of each edge guard from the roll formed material. End caps 14 serve to conceal this otherwise exposed metal.

Each end cap 14 comprises an outer, or exterior, wall 34 of generally U-shaped cross section fitting closely onto the exterior of the U-shaped cross section of edge guard 10 to cover base 16 and both inner and outer legs 18 and 20. The height of wall 34 in the direction of the length of the edge guard is dimensioned to provide a sufficient amount of overlap with the marginal end of the edge guard. In the illustrated embodiment, the outer wall 34 fully covers the base, the two legs, and extends in covering relation to the distalmost portion of both legs to contact the sides of the door edge at 36 and 38.

Each end cap 14 further comprises an inner, or interior, wall 40 that fits closely onto the interior of the U-shaped cross section of the edge guard to cover at least the base, but not to cover the distal ends of the legs at the self-retention locations 30 and 32. In this way, the interior wall in no way interferes with the self-retention action at the lengthwise ends of the edge guard where they are covered by the end caps.

Each end cap 14 further has an end wall 42 that joins with both walls 34 and 40 and is disposed in covering relation to the cut-off end of the edge guard so that the exposed metal that would otherwise be visible, is concealed from view by virtue of the end cap.

The end caps are preferably fabricated from any suitable rubber or plastic. As such, each end cap can be molded as a single piece in which the end wall 42 integrally joins with both interior wall 40 and exterior wall 34. Since the end of each cap opposite end wall 42 is open, the edge cap is assembled onto the edge guard simply by appropriate alignment with the end of the edge guard and then pushing the end cap onto the edge guard. It is contemplated that with suitable dimensioning, the frictional forces and slightly resiliently deformable character of the end cap will enable the end cap to be self-retaining on the end of the edge guard without the use of any further means of attachment such as adhesive. However, if desired, such additional means of attachment could be used because the end cap will generally be a fairly tiny piece. The illustrated embodiment substantially approximates the relative proportions between various thicknesses of the end cap walls in relation to a typical door edge guard thickness.

Figure 2:
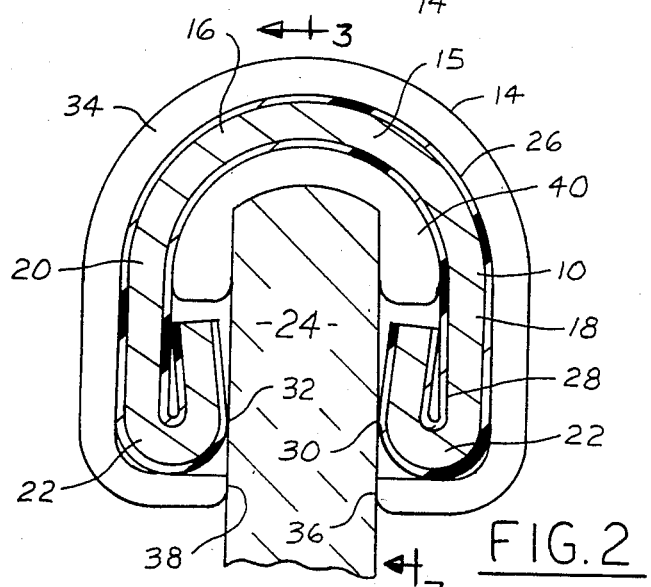
FIG. 2 is a transverse cross sectional view taken generally in the directions of arrows 2—2 in FIG. 1 and enlarged.

From consideration of FIG. 2, one might conclude that the thickness of interior wall 40 is sufficient to space the door edge guard away from the door edge such that insulating material on the interior of the door edge guard may be unnecessary. It is certainly conceivable that this could be the case and an acceptable practice in certain door edge guard installations. However, the use of insulating material on the interior of the edge guard as described earlier is preferred because the span of a typical edge guard between end caps 14 will usually be sufficiently great that some contact is likely to occur at least at some point along the length of the edge guard, in which case the use of an interior insulating layer on the edge guard will provide the desired protective insulation function.

The layer of non-metallic material on the exterior surface of the edge guard is typically intended to provide for color coordination with the color of the door on whose edge the edge guard is installed. For example, matching colors may be deemed desirable. The end caps may also be color coordinated for matching the color on the exterior of the edge guard, such color being imparted to the end caps in the molding process.

Figure 3:
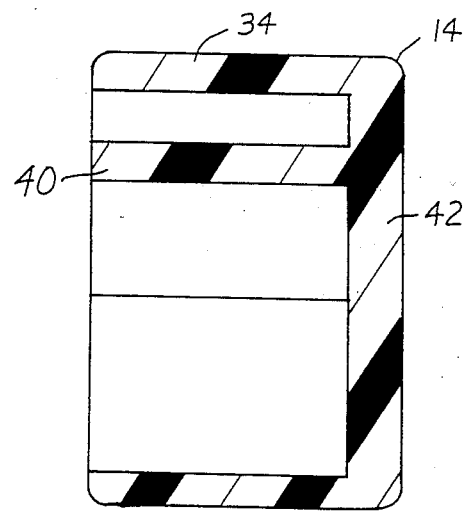
FIG. 3 is a cross sectional view taken in the direction of arrows 3—3 in FIG. 2, showing only the end cap.
Figure 4:
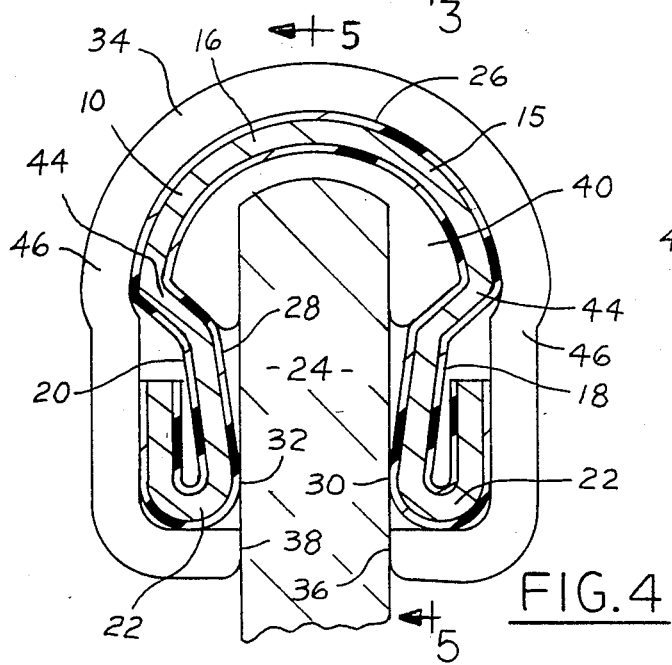
FIG. 4 is a view similar to FIG. 2 but illustrating another embodiment.
Figure 5:
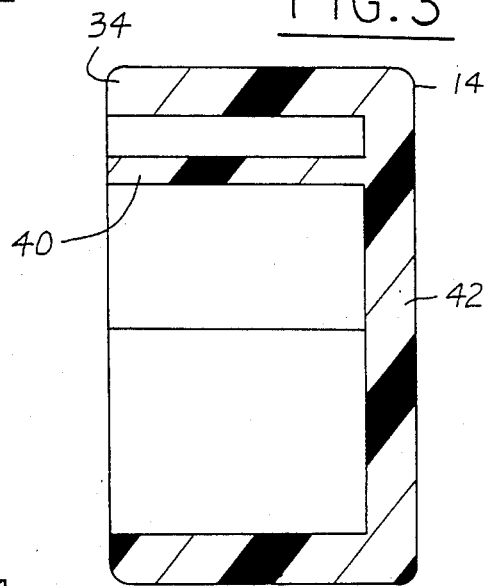
FIG. 5 is a cross sectional view taken in the direction of arrows 5—5 in FIG. 4, showing only the end cap.

FIGS. 4 and 5 illustrate another embodiment of end cap and door edge guard which posseses the same principles as disclosed in connection with the embodiment described in FIGS. 2 and 3. Accordingly, like reference numerals in the FIGS. 2–5 are used to designate like parts. The principal difference between the two embodiments resides in the edge guard of FIG. 4 having beads formed by reverse turning of the distal end margins of the legs outwardly back against themselves and with the inclusion of an offset 44 at the point where the base merges into each leg. The interior wall 40 is shaped in covering relation to the interior surfaces of these offsets but that is as far distially as the interior wall extends. In this way, the end caps do not interfere with the self-retention action of the beaded distal ends of the legs against opposite sides of the door edge at the lengthwise ends of the edge guard where covered by the end caps. It is also to be observed that the end cap includes small offsets 46 corresponding to the offsets 44 in the edge guard.

While a preferred embodiment of the invention has been disclosed, it will be appreciated that principles are applicable to other embodiments.

What is claimed is

1. In combination with the trailing edge of a swinging closure, such as an automobile door, onto which is fitted an elongate ornamental and protective metallic edge guard having a transverse cross section comprising a curved base from which extend inner and outer legs that apply self-retention forces to opposite sides of said trailing edge, said edge guard being cut off at the lengthwise ends thereof so that the metal at the points of cutting is exposed, at least one end cap fitted onto at least one of said cut-off ends of the elongate edge guard, said end cap comprising an exterior wall of transverse cross section fitting closely onto the exterior of the cross section of the edge guard in covering relation to the base and the legs of the edge guard, an interior wall of transverse cross section that fits closely in covering relation onto the interior of the cross section of the edge guard in covering relation to at least the interior of the edge guard base but leaving distal ends of the edge guard's legs uncovered by said interior wall so that the self-retention force of the legs on the edge is unencumbered by the end cap at the cut-off end of the edge guard onto which the end cap is disposed, and an end wall joining the interior and exterior walls of the end cap in covering relation to the cut-off end of the edge guard onto which the end cap is disposed.

2. An end cap as set forth in claim 1 in which the exterior wall of the end cap extends to fully cover the full extent of at least one leg, including the distalmost portion of that leg, and is in abutment with the side of the trailing edge.

3. An end cap as set forth in claim 1 in which at least one of the legs of the edge guard has a beaded distal end that is formed by reverse turning the marginal edge of the metal strip from which the edge guard is formed back against itself and in which the interior wall of the end cap does not extend from the base as far as the bead so that the self-retention force of the edge guard is applied by the bead without interference from the end cap.

4. An end cap as set forth in claim 1 in which the edge guard includes colored non-metallic insulating material on at least a portion of the exterior of its cross section and said end cap is a non-metallic material that is colored the same as the insulating material on the exterior of the edge guard.

5. An end cap as set forth in claim 1 in which said edge guard includes non-metallic insulating material lining at least a portion of one of the exterior and interior of the edge guard's cross section.

6. An end cap as set forth in claim 5 in which at least some of the insulating material is disposed on the exterior of the cross section of the edge guard and said end cap comprises a molded non-metallic material colored the same as that portion of non-metallic material on the exterior of the edge guard.

* * * * *